United States Patent [19]
Agrawal et al.

[11] Patent Number: 6,072,990
[45] Date of Patent: *Jun. 6, 2000

[54] TRANSMITTER-RECEIVER PAIR FOR WIRELESS NETWORK POWER-CODE OPERATING POINT IS DETERMINED BASED ON ERROR RATE

[75] Inventors: Prathima Agrawal; Balakrishnan Narendran, both of New Providence; James Paul Sienicki, Edison; Shalini Yajnik, Scotch Plains, all of N.J.

[73] Assignee: Lucent Technologies, Inc., Murray Hill, N.J.

[ * ] Notice: This patent is subject to a terminal disclaimer.

[21] Appl. No.: 08/848,392

[22] Filed: May 8, 1997

[51] Int. Cl.[7] ...................................................... H04Q 7/20

[52] U.S. Cl. ............................... 455/69; 455/63; 455/522

[58] Field of Search ................................ 455/69, 88, 522, 455/67.1, 67.3, 63, 515, 434

[56] References Cited

U.S. PATENT DOCUMENTS

| | | | |
|---|---|---|---|
| 4,777,653 | 10/1988 | Bonnerot et al. | 455/69 |
| 5,093,842 | 3/1992 | Gimlin et al. | 375/10 |
| 5,128,965 | 7/1992 | Henriksson | 455/69 |
| 5,345,598 | 9/1994 | Dent | 455/522 |
| 5,386,589 | 1/1995 | Kanai | 455/522 |
| 5,722,051 | 2/1998 | Agrawal et al. | 455/522 |
| 5,778,316 | 7/1998 | Persson et al. | 455/434 |

OTHER PUBLICATIONS

IEEE Transactions on Vehicular Technology, vol. 41, No. 3, Aug. 1992; pp. 266–270; "Performance Analysis of RS–Coded M–ary FSK for Frequency–Hopping Spread Spectrum Mobile Radios"; by T. Matsumoto et al.

IEEE Transactions on Communications, vol. 40, No. 9, Sep. 1992; pp. 1474–1480; "Analysis of Memory & Incremental Redundancy ARQ Schemes Over a Nonstationary Channel"; by Samir Kallel.

IEEE Transactions on Vehicular Technology, vol. 43, No. 1, Feb. 1994; pp. 33–39; "Uplink Power Control for TDMA Portable Radio Channels"; by J. Chuang et al.

IEEE Transactions Vehicular Technology, vol. 44, No. 1; Feb. 1995; pp. 89–94; "Downlink Power Control Algorithms for Cellular Radio Systems"; by T–H Lee et al.

Proc. IEEE MILCOM, Ft. Monmouth, NJ, Oct. 2–5, 1994; pp. 178–182; "Power Control for Variable QOS on a CDMA Channel"; by Louis C. Yun et al.

ICC '95, Seattle, WA, Jun. 18–22, 1995; IEEE; pp. 988–992; "Variable Rate Error Control for Wireless ATM Networks"; David Moore et al.

IEEE Transactions on Vehicular Technology, vol. 41, No. 4; No. 1992; pp. 532–536; "Forward–Link–Power Control in CDMA Cellular Systems"; by R. R. Gejji (List continued on next page.)

*Primary Examiner*—Edward F. Urban
*Assistant Examiner*—Tilahun Gesesse

[57] ABSTRACT

A method and system for adaptively determining an operating point for a transmitter-receiver pair in a wireless communication network. The receiver receives data over an uplink and measures an average observed word error rate avg_WER of the received data and transmits the average observed word error rate avg_WER over a downlink to the transmitter when the average observed word error rate avg_WER is not within an acceptable word error rate range. The transmitter receives the average observed word error rate avg_WER over the downlink and determines a power-code pair (P,c) for the transmitter based on the average observed word error rate avg_WER. The power code pair (P,c) defines an operating point of the transmitter, where P of the power-code pair is a selected transmit power level of the transmitter and c of the power-code pair is a selected forward error correcting code used for encoding the data. The receiver can also determine a predicted word error rate $WER_{pred}$ for a first timeframe based on the observed word error rate $WER_{obs}$ for a second timeframe, and determines whether the predicted word error rate $WER_{pred}$ is within the acceptable word error rate WER range.

33 Claims, 11 Drawing Sheets

OTHER PUBLICATIONS

IEEE Transactions on Vehicular Technology, vol. 43, No. 1; Feb. 1994; pp.33–39; "A Transmit Power Control Scheme for Improving Performance in a Mobile Packet Radio System"; by Victor Wong et al.

IEEE Global Telecommunications Conference in Houston, Nov. 29–Dec. 2, 1993; pp. 307–310; "Autonomous SIR–Based Power Control for a TDMA Radio System"; by S. Ariyavisitakul.

IEEE Infocomm 1996 (9b.3.1–9b.3.8); pp. 1125–1132; "Unified Power Control Error Correction Coding and Scheduling for a CDMA Downlink System"; by Yuming Lu et al.

IEEE ICC'95 Seattle, WA, vol.1, Jun 18–22; pp. 331–335; "Information Capacity and Power Control in Single–Cell Multiuser Communications"; by R. Knopp et al.

TRANSMITTER-RECEIVER PAIR FOR WIRELESS NETWORK POWER-CODE OPERATING POINT IS DETERMINED BASED ON ERROR RATE

BACKGROUND OF THE INVENTION

1. Field of the Invention

The present invention relates to the field of telecommunications. More particularly, the present invention relates to a method and a system for controlling transmission power and reception errors in wireless communication systems.

2. Description of the Related Art

Wireless systems are increasingly being used for transmitting different types of data, from traditional telephone quality audio, to more recent applications involving video or electronic documents. Each of these different data types has a different channel requirement such as, for example, bandwidth and error rates. Additionally, wireless communication channels are characterized by an unpredictability caused by various factors such as, for example, co-channel interference, adjacent channel interference, propagation path loss and fading. As a result, a wireless channel can experience widely varying bandwidth and transmission error characteristics as the signal and noise/interference levels of the channel vary with respect to other channels.

Explicit measures have previously been taken for maintaining the quality of a transmission over a radio channel. Such measures typically try to control various channel quality metrics, such as Error Rates, Carrier-to-Interference Ratios, Bandwidth, etc., by controlling various channel transmission parameters like Transmission Power, and the Forward Error Correction (FEC). For example, the particular factor that effectively determines the error characteristics of the raw channel are the relative levels of the signal and the noise/interference experienced at the receiver, that is, the carrier-to-interference ratio (CIR):

$$CIR = \frac{\text{Received signal power}}{\text{Interference power}} \quad (1)$$

The numerator of Equation (1) is affected by parameters such as transmission power, propagation loss, and fading. Similarly, parameters such as received powers from interfering connections, and ambient radio noise affect the denominator of Equation (1).

The effective bit error rate (BER) for digital transmissions further depends on the modulation scheme used. In the following description, an exemplary binary phase shift key (BPSK) modulation is considered. The relationship between CIR and BER for a BPSK modulation is:

Data transmission is usually packetized into words so that the error granularity is at the word level. Consequently, the error rate of interest is the $$\langle BER \rangle = \frac{1}{2}\left(1 - \frac{1}{\sqrt{1 + \frac{1}{CIR}}}\right) \quad (2)$$

word error rate (WER) as seen at the receiver. For a given BER, the observed WER depends on the type of forward error correction scheme used. Thus, each connection in a wireless system has an associated reliability constraint expressed as a desired word error rate, $WER_{des}$, and a range of acceptable word error rates having upper and lower limits denoted by $WER_u$ and $WER_l$, respectively. The upper limit $WER_u$ is used for maintaining acceptable channel quality, while the lower limit $WER_l$ is used for keeping connections acceptable without wasting bandwidth or power for further improvements in quality, particularly when resources of a wireless system are scarce. As mentioned, there are two conventional approaches for keeping the WER within the acceptable word error rate range. The first approach controls the CIR by controlling transmit powers, while the second approach controls the forward error correction (FEC) encoding the data.

In any such channel control scheme, each channel in the system typically observes its own channel conditions for a defined timeframe, and determines whether the channel quality is satisfactory. If the channel quality during a timeframe is determined to be unsatisfactory, this information and any required parameters are relayed back to the transmitter. The transmitter then makes appropriate changes to the transmission parameters for the channel for bringing the channel quality back to satisfactory levels. The frequency that this feedback process is performed has an impact on the total overhead imposed on the system, as well as the resultant channel quality level that is attained. That is, a frequent feedback is likely to maintain relatively better channel quality levels, but suffers from relatively high system overhead costs in terms of channel control. At the other extreme, infrequent feedback requires relatively less overhead, but may let channel qualities deteriorate below desired quality levels. It is often desirable to operate at different feedback frequencies between these two extremes and to let connections in the system determine an operating point that is appropriate to their respective requirements. For example, it might be desirable to let a new connection experience more frequency feedback control so that it is quickly integrated into the system, while established connections should be controlled to a relatively lesser extent so that they do not respond to transient changes in the system such as those caused by new connections.

Power control is basically a technique of controlling the transmit power and affecting the received power and, as a consequence, the CIR. In free space, for example, the propagation path loss depends upon the frequency of transmission f, and the distance between transmitter and receiver d, as: where, $P_t$ is the transmitted power, $P_r$ is the received power in free space, c is the speed of light, and $\alpha$ is an attenuation constant.

$$\frac{P_r}{P_t} = \frac{1}{(4\pi df/c)^\alpha} \quad (3)$$

Assuming that the interference remains constant, a desired $P_r$ (and thus a desired CIR) is attained by adjusting the transmit power $P_t$ appropriately. This can be done by observing the current transmit and received powers, and based on the assumption that the distance d does not change significantly between the observation time and the time $P_t$ is adjusted.

While a power control approach can often be quite effective, there are several disadvantages. Firstly, since battery power of a mobile station is a limited resource requiring conservation, it may not be possible or even desirable to set high transmit powers values. Secondly, increasing the transmitted power on one channel, regardless of the power levels used on other channels, can increase the co-channel interference for other channels and, hence, degrade the quality of transmission over other channels. As a result, there is the possibility that a set of connections controlled by a pure power control approach can suffer from unstable behavior requiring increasingly higher transmit powers. Finally, power control techniques are limited by the physical limitations on the transmitter power levels.

Examples of conventional power control approaches based on a CIR for managing co-channel interference are disclosed by J. C. Lin et al., Downlink power control algorithms for cellular radio systems, IEEE Trans, Vehicular Technology, 44(1):89–94, Feb. 1995; J. C. I. Chuang et al., Uplink power control for TDMA portable radio channels, IEEE Trans. Vehicular Technology, 43(1):33–39, Feb. 1994; R. Knopp et al., Information capacity and power control in single-cell multiuser communications, In Proc. ICC'95, volume 1, pages 331–335, Wash., Seattle, June 1995; and R. R. Gejji, Forward-link-power control in CDMA systems, IEEE Trans. Vehicular Technology, 41(4):532–536, November 1992, each of which are incorporated by reference herein. Another power control technique that increases throughput in a multiuser environment is disclosed by V. Wong et al., A transmit power control scheme for improving performance in a mobile packet radio system, IEEE Trans, Vehicular Technology, 43(1):174, 180, February 1994, which is incorporated by reference herein. An exemplary power control technique for improving quality-of-service over a channel is disclosed by L.C. Yun et al., Power control for variable QOS on a CDMA channel, In Proc. IEEE MILCOM, pages 178–182, Fort Monmouth, N.J., October 1994, which is incorporated by reference herein.

In a system using an FEC approach for error control, the transmitter and receiver use a mutually agreed upon code for protecting the data. The receiver, upon decoding a received word, is capable of correcting up to a specified number of bit errors suffered by the word in transit. The degree of error tolerance, as well as the extra number of bits required for encoding, depend on the particular FEC code used. A code is said to be an (n,k,t) code if for k information bits, (n-k) redundant bits are added for correcting any t errors in the resulting word of n bits. The error correcting capability of the code determines the observed WER for a given channel BER p. Assuming that the bursty nature of errors is countered by using a code that is significantly bit-interleaved so that each bit error in a word is independent of bit errors, the observed WER can be computed by $$WER = \sum_{i=t+1}^{n} \binom{n}{i} p^i (1-p)^{n-i} \quad (4)$$

The code rate of an (n,k,t) code is k/n, i.e., the ratio of the number of information bits in a codeword to the total number of bits. The code rate determines the effective utilization of the total throughput capacity of a channel. The term power per information bit describes the quantity nP/k, where a transmit power P is used to transmit data using an (n,k,t) code. Given a particular BER p, using FEC for controlling channel quality implies using a code having an appropriate error correcting capability t providing the desired WER. The primary shortcoming of using FEC control is that effective throughput of the channel is significantly reduced as codes with increasing values of t are used for combatting a low CIR.

Exemplary error control by data encoding approaches are disclosed by D. Moore et al., Variable rate error control for wireless ATM networks, In Proc. ICC'95, volume 2, pages 988, 992, Seattle, Wash., June 1995; T. Matsumoto et al., Performance analysis of RS-coded M-ary FSK for frequency-hopping spread spectrum mobile radios, IEEE Trans. Vehicular Technology, 41(3):266–270, August 1992; and R. H. Deng et al., An adaptive coding scheme with code combining for mobile radio systems, IEEE Trans. Vehicular Technology, 42(4):469–476, November 1993, each of which is incorporated by reference herein.

Recently, an approach using power control, error correction coding, and scheduling for a CDMA system for maximizing a "system utility" function that measures the system satisfaction is disclosed by Lu et al., Unified power control, error correction coding and scheduling for a CDMA downlink system, In Proc. IEEE Infocom '96, pages 1125–1132, San Francisco, Calif., March 1996, and is incorporated by reference herein.

SUMMARY OF THE INVENTION

The present invention advantageously provides a method and a system that can be used for augmenting any wireless channel control scheme by trading off channel control overhead with an ability to maintain channel quality. According to the invention, each connection in a system utilizing the present invention determines its own operating point in this spectrum as a tradeoff between channel control overhead and channel quality requirements.

The present invention is a method and system for determining an operating point of a transmitter of a transmitter-receiver pair in a wireless communication network, the method comprising the steps of: averaging an observed word error rate $WER_{obs}$ for data transmitted during a plurality of timeframes over a link between a transmitter-receiver pair for a predetermined number of timeframes to generate an average observed word error rate avg_WER; determining whether the averaged word error rate avg_WER is within an acceptable word error rate WER range; and determining a power-code pair (P,c) for a transmitter of the transmitter-receiver pair when the average observed word error rate avg_WER of the link between the transmitter-receiver pair is not within the acceptable word error rate WER range, the power code pair (P,c) defining the operating point of the transmitter, P of the power-code pair being a selected transmit power level of the transmitter and c of the power-code pair being a selected forward error correcting code used for encoding the data.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides a method and a system that can be used for augmenting any wireless channel control scheme for allowing individual connections to operate at a self-determined operating point that is a tradeoff between the amount of control overhead used by the channel and the resulting channel quality. The underlying channel control scheme can be of any type that individually tailors transmission parameters for each connection, or link, in response to the state of the link and the environmental quantities the link experiences. The transmission parameters can be one or more quantities, such as Transmit Power, Forward Error Control scheme, etc. The desired state of the link can be expressed similarly using one or more parameters, such as Interference Levels, Carrier-to-Interference Ratios, Error-Rates, etc. While the present invention is applicable to any combination of transmission parameters and desired link state parameters, the following description illustrating the present invention uses transmitter power levels and the forward error correction as the controlled transmission parameters, and the observed Word Error Rate (WER$_{obs}$) as the desired link quality parameter that is to be maintained at the receiver.

Figure 1:
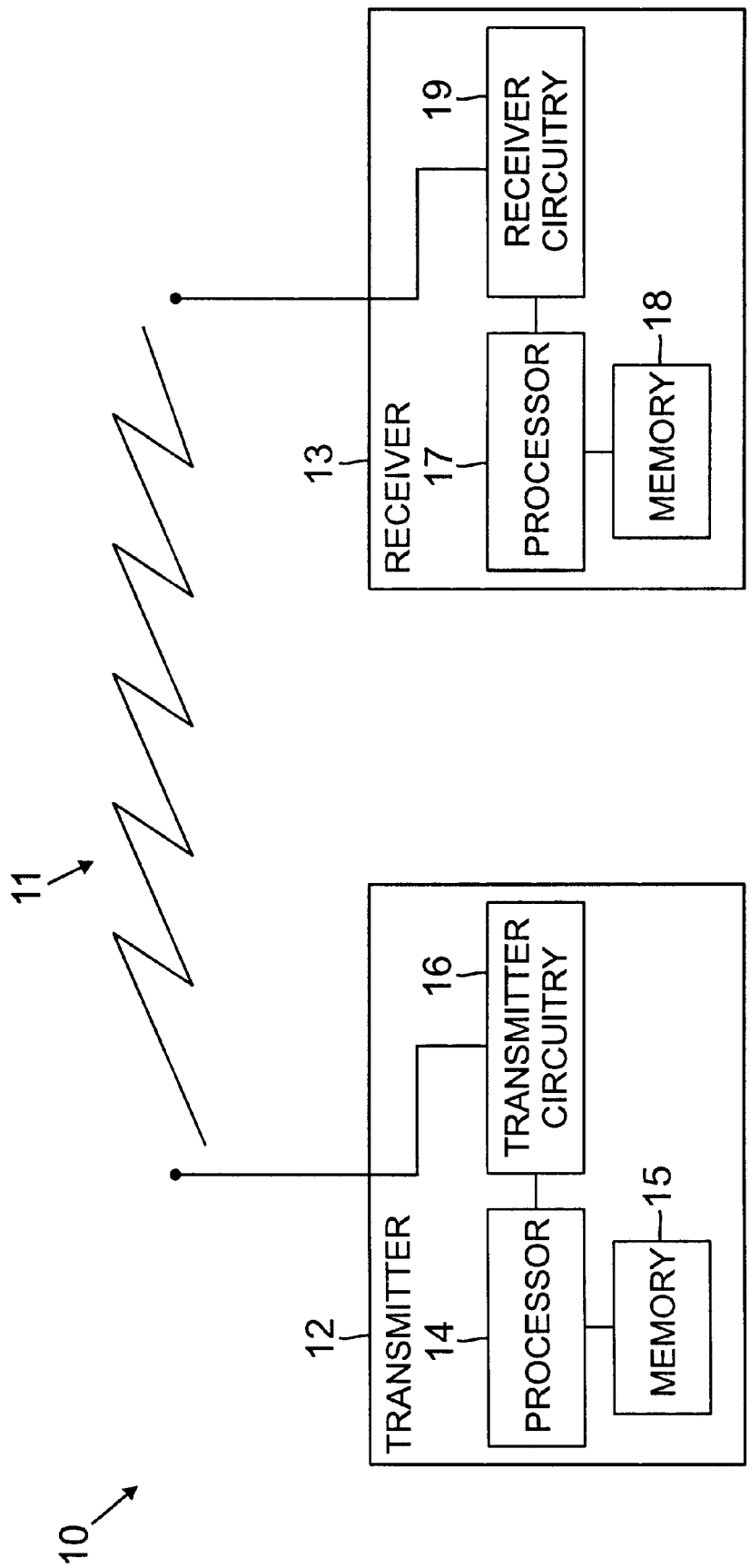
FIG. 1 shows a schematic block diagram of an exemplary transmitter-receiver pair.

FIG. 1 shows a schematic block diagram of an exemplary transmitter-receiver pair 10. A wireless connection or link 11 is formed between transmitter 12 and receiver 13. Link 11 is a wireless channel at a single frequency and transmitter 12 transmits data continuously using the single frequency. Transmitter 12 has a minimum and a maximum power level between which it is allowed to operate. In general, transmitter 12 of the transmitter-receiver pair can be a mobile station or a base station. Similarly, receiver 13 can be a mobile station or a base station. While only a single transmitter-receiver pair is shown, the present invention is applicable to a plurality of transmitter-receiver pairs operating simultaneously over a plurality of respective links at a plurality of different transmission frequencies.

Transmitter 12 includes a processor 14 coupled to a memory 15 and to a transmitter 16. Transmitter 12 encodes the transmitted data using a forward error correcting encoding scheme selected from a plurality of encoding schemes represented by $C=\{c_0, c_1, \ldots, c_n\}$ and stored in memory 15. At any point during the lifetime of channel 11, the operating point of transmitter 12 is defined by a set of transmission parameters, which for this particular case is a power-code pair (P,c), where P defines the current transmit power level of transmitter 12 and c identifies the current FEC encoding scheme.

Receiver 13 includes a processor 17 coupled to a memory 18 and a receiver 19. The received power level, the word error rate and the interference level for link 11 are measured and monitored in a well-known manner at receiver 13. The interference level, in particular, includes effects of other channels in the system using the same frequency (not shown). The desired word error rate for the link is $WER_{des}$. $WER_l$ and $WER_u$ are the lower and upper tolerance limits for the link, respectively.

The control process of the present invention is iterative with transmitter 12 and receiver 13 collaborating at each iteration for evaluating channel performance and, if necessary, modifying the transmission parameter of the power-code pair (P,c) in use at transmitter 12. In the following description, superscripts are used for denoting an iteration. For example, $(P^k, C^k)$ denotes the power-code pair used during the $k^{th}$ iteration. Similarly, $P^k_{obs}$, $I^k_{obs}$ and $WER^k_{obs}$ denote the received power, interference, and the WER observed at receiver 13 during the $k^{th}$ iteration. The time period between successive iterations, called a timeframe, is preferably at least as long as is required for obtaining reasonable estimates for the measurements.

At the end of each timeframe, receiver 13 checks the measured values for determining whether channel quality requirements were met during the timeframe. Basically, receiver 13 performs a simple check for determining whether $WER^k_{obs}$ is satisfactory. If $WER^k_{obs}$ is not acceptable, receiver 13 sends a message to transmitter 12 indicating the detected condition along with $P^k_{obs}$, $I^k_{obs}$, and $WER_{des}$. Transmitter 12 uses the received values for determining a new power-code pair that will be used during the next timeframe.

Candidate power-code pairs are determined by transmitter 12 as follows. For each possible code $c_i$, a carrier-to-interference ratio $CIR^*(c_i)$ is obtained from Equation (2) and Equation (4). $CIR^*(c_i)$ is the CIR value that attains $WER_{des}$ for $c_i$. The transmit power $P^*_t(c_i)$ needed for achieving $CIR^*(c_i)$ when the data is encoded using code $c_i$ is then computed using the relationship:

$$\frac{P_t^*(c_i)}{P_t^k} = \frac{CIR^*(c_i)}{CIR^k} = CIR^*(c_i)\frac{I^k_{obs}}{P^k_{obs} - I^k_{obs}} \qquad (5)$$

Of course, use of this relationship assumes that the observed interference and the distance between transmitter and receiver does not change significantly between successive iterations.

A candidate power-code pair $(P^*_t(c_i), c_i)$ is feasible if $P^*_t(c_i)$ is a feasible power setting for the transmitter, i.e., $P^*_t(c_i)$ is between the minimum and the maximum power levels for the transmitter. For a feasible power-code pair $(P^*_t(c_i), c_i)$, the power per information bit $P_{*t}(c_i)/\text{rate}(c_i)$ is determined, where rate($c_i$) is the code rate of code $c_i$. Of all the feasible power-code pairs, transmitter 12 then selects the power-code pair that provides the least power per information bit.

In practice, inverting Equations (2) and (4) for determining $CIR^*(c_i)$ can be impractical. In order to avoid complicated calculations, the possible WER$_{des}$ values can be restricted to a pre-assigned set, and transmitter 12 simply selects a suitable CIR*(c$_i$) value for the target WERs from a precomputed table stored in memory 15, for example.

An example of the structure of a typical channel control method assumed henceforth is shown in Table I below:

TABLE I

Receiver code for iteration K:
    measure and record P$^k_{obs}$, WER$^k_{obs}$, and I$^k_{obs}$
    if (not good_connection) then
        send parameters to transmitter
    endif
Transmitter code (on receiving parameters from receiver):
    compute new transmission parameters (new power-code pair)
    use new parameters for succeeding iterations The receiver loop of Table I is executed by processor 17 of receiver 13 once every iteration. If the channel quality is found unsatisfactory during the k$^{th}$ iteration, receiver 13 sends the observed parameters (P$^k_{obs}$, WER$^k_{obs}$, and I$^k_{obs}$, for the example of Table I) to transmitter 12, which then uses the observed parameters for determining the new transmitter parameters (the new power-code pair in this example). The condition clause "good_connection" is used by receiver 13 for determining whether link 11 is satisfactory at the k$^{th}$ iteration. One simple way of defining the good_connection clause is to check whether WER$_{obs}$ for the timeframe is within the required bounds defined by WER$_l$ and WER$_u$. In this case, a transmission parameter change is invoked for each iteration that WER$_{obs}$ is unsatisfactory. This approach is referred to as the "basic method" of the present invention.

At a given iteration, it is possible that there are no feasible power-code pairs that satisfy the desired WER constraints. When this happens, transmitter 12 sets the power P to the maximum power setting and the code c to the encoding scheme that provides the maximum forward error correction capability for the next iteration. Transmitter 12 and receiver 13 then proceed as before.

Each timeframe in which WER$_{obs}$ exceeds the upper threshold WER$_u$ is flagged as a bad timeframe. Since a wireless communication environment is constantly changing, it is possible that a particular connection can continue to experience successive bad timeframes despite constantly updated power-code pair that would appear to be sufficient settings for each iteration. To balance the need for allowing a connection enough recovery time against the necessity of preventing bad connections from persisting for too long, the present invention includes a connection drop policy. That is, an unsatisfactory or bad connection is allowed to exist for a grace time period T that spans several consecutive timeframes. After the grace time period T has expired, a small initial probability of dropping the connection P$_{drop}$ is associated with the connection. Probability P$_{drop}$ is increased for each consecutive timeframe that suffers an unsatisfactory connection after time period T expires. Once a satisfactory timeframe is experienced, the grace time period T is reset. Thus, the probability of dropping the connection P$_{drop}$ is:

$$P_{drop} = \begin{cases} 1 - (1 - P_{initial})^x & x > T \\ 0 & \text{otherwise} \end{cases} \quad (6)$$

where P$_{initial}$ is the probability of dropping the connection after one unsatisfactory timeframe, and x is the number of consecutive timeframes that are unsatisfactory after grace time period T expires. The value chosen for P$_{initial}$ is preferably on the order of 10$^{-2}$.

An important factor in adaptive control of a wireless channel connection is the overhead associated with performing the control. In the context of the present invention, the fraction of timeframes during which a connection is required to update parameter settings is a measure of the control overhead, and the fraction of timeframes during which the connection is bad is a measure of unsatisfactory channel quality. Generally speaking, if maintaining a required channel quality requires frequent control parameter changes for power and coding, the control approach in practice may not be worth the result. To avoid frequent control parameter changes, the present invention includes a windowing feature that adapts to the environment of the connection in a lazy-type manner, advantageously foregoing some channel quality for a corresponding decrease in channel control overhead. Additionally, the present invention can modify channel parameters in an anticipatory manner even though current channel conditions may be satisfactory. While this can cause an increase in channel control overhead, resultant gains are achieved in the ability to maintain channel quality. Generally speaking, both of these variations of the present invention differ from the basic algorithm only in the manner in which the good_connection condition is evaluated by the receiver.

The basic method of the present invention determines whether a power-code revision should be invoked each time WER$_{obs}$ is unsatisfactory during an iteration. However, a power-code revision may not always be necessary, nor even desirable in all cases. Instead, the windowing aspect of the present invention causes a power-code update only when an average WER observed over several timeframes becomes unsatisfactory, that is, avg_WER falls outside the acceptable WER range. This embodiment of the present invention uses an averaging window of a predetermined number of timeframes for each connection for determining whether a power-code update should occur. Thus, it is possible that each respective connection in a wireless system has a different window size for measuring the respective average word error rate. Further, it is also possible that each respective connection in the wireless system has a window size that varies at a different rate independently from other connections. Additionally, the windowing feature of the present invention fairly allocates the burden of adaptation among the different connections in the system. That is, established connections are allowed to react slowly, or not react at all, to abrupt or transient changes in the system. Newly created connections, that is, the connections most likely causing transient changes in the system environment, are allowed to adapt themselves to the existing stable system. It is only when the adapting attempts performed by new connections are unsuccessful in stabilizing the system after a predetermined period of time that the established connections must attempt to adapt their own status.

In greater detail, the windowing feature of the present invention sets a current window size (cws) for each connection that is an integer multiple of a timeframe. The connection continues to update its status in a normal manner and can make changes to its power-code pair for any timeframe. This variation of the present invention measures the observed WER$_{obs}$ over a predetermined number of timeframes. That is, the observed WER$_{obs}$ at any time is an average observed WER occurring over cws timeframes. The value of cws for a connection is initially 1 timeframe at start up, and remains at its current value for up to cws iterations, after which the cws doubles, subject to a maximum window size, or timeframes. In any given timeframe, if the current avg_WER exceeds $WER_u$, an attempt is made to change the power-code pair, as described above, and cws is reset to 1. Using this definition of good_connection, the present invention responds to changes in the observed word error rate $WER_{obs}$ and adapts the power-code pair for maintaining the channel quality requirements.

In terms of the pseudocode of Table I, the condition "good_connection" is evaluated during the $k^{th}$ iteration as follows:

$$avg\_WER^K = \sum_{i=0}^{cws-1} WER_{obs}^{k-i}$$

$$good\_connection = (WER_l \le avg\_WER^k \le WER_u).$$

The present invention can also anticipate changes in the error rate caused by station mobility by observing trends in the received power and extrapolating the WER value for the next timeframe. If the anticipated WER is expected to be unsatisfactory, then an appropriate change in the power-code setting is initiated immediately without the connection actually experiencing a bad timeframe. For this embodiment, the definition of "good_connection" used in the pseudocode of Table I is:

$$P_{pred} = P_{obs}^k + (P_{obs}^k - P_{obs}^{k-1})$$

$$I_{pred} = I_{obs}^k + (I_{obs}^k - I_{obs}^{k-1})$$

$$CIR_{pred} = P_{pred} / I_{pred}$$

$$WER_{pred} = WER \text{ for (current code} \wedge CIR \text{ of } CIR_{pred})$$

$$good\_connection = (WER_l \le WER_{pred} \le WER_u)$$

It should be noted that the predictive feature of the present invention does not eliminate sudden changes in error rates caused by fading or arrival of a new mobile transmitter into the system. Additionally, this predictive feature may trigger unnecessary power-code updates caused by false predictions depending upon the circumstances.

Figure 2:
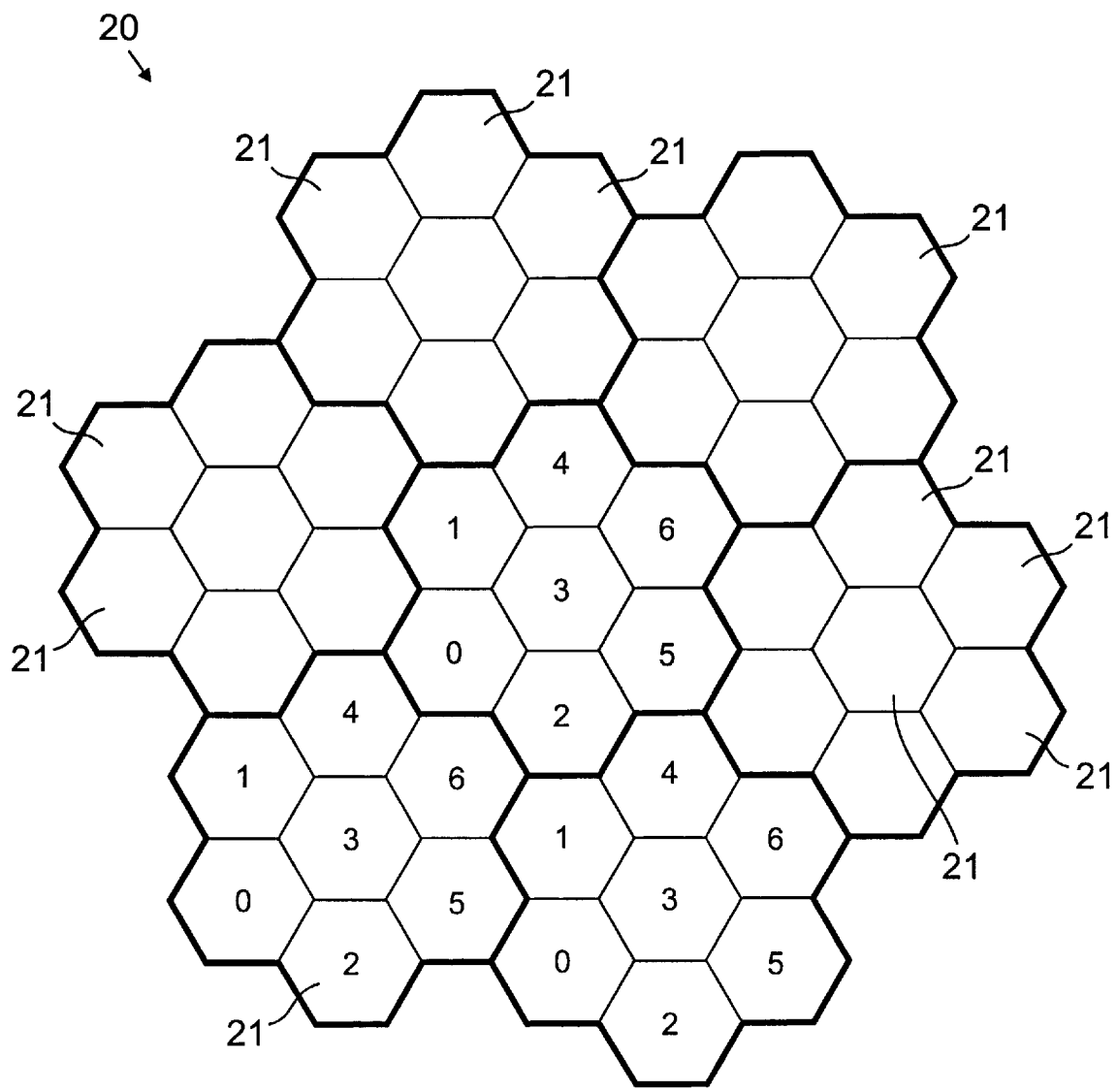
FIG. 2 shows a hexagonal cell grid layout used for computer simulating the method of the present invention.

The performance of the various adaptive aspects of the present invention have been simulated by a computer model for a wireless system having a plurality of mobile stations in a large cellular system. The cellular system grid model used is a traditional cellular system having a two-dimensional grid of 64 hexagonal cells, with each cell having a radius of 2 km. FIG. 2 shows a portion of the hexagonal cell layout 20 used for the computer simulation. The grid was modeled to wrap around on itself for avoiding edge-effects. A fixed channel allocation with 50 duplex channels per cell was used with a frequency reuse factor of 7. Cell layout 20 includes a partial labeling of channel cluster sets 0–6. Each cell 21 of the model grid 20 includes a base station located at the cell center (not shown) and a plurality of mobile stations (not shown) within the cell communicating with the base station. Each mobile station accounts for two connections, that is, an uplink and an associated downlink. For the most part, these two connections were independently managed by the present invention. When one of the two connections was dropped, the simulation model dropped the other associated connection so that both connections were released.

The mobile stations were initially distributed for the simulation uniformly within the cells. The number of mobile stations in the system was controlled by a load factor parameter representing the fraction of the cell capacity in use. For the simulation, the mobile stations were set to depart after an average holding time of 3 minutes and the arrival rates of mobile stations were set to maintain the initial load factor. The mobile stations in the system were modeled to move in fixed directions that were randomly assigned when the mobile stations arrived into the system. Mobile station speeds were distributed from 0 to 60 miles per hour.

Given the asymmetric nature of cellular systems, the simulation model had different feasible power ranges for uplink and downlink connections. Downlink channels had a maximum power level setting of 100 watts, and uplink channels could use up to 1 watt each. The set of BCH (Bose, Chaudhuri, Hocquenghem) codes with parameters indicated in Table II were used.

TABLE II

| Code | n | k | t |
|---|---|---|---|
| $c_1$ | 63 | 63 | 0 |
| $c_2$ | 63 | 57 | 1 |
| $c_3$ | 63 | 51 | 2 |
| $c_4$ | 63 | 45 | 3 |
| $c_5$ | 63 | 39 | 4 |
| $c_6$ | 63 | 36 | 5 |
| $c_7$ | 63 | 30 | 6 |
| $c_8$ | 63 | 24 | 7 |
| $c_9$ | 63 | 18 | 10 |
| $c_{10}$ | 63 | 16 | 11 |
| $c_{11}$ | 63 | 10 | 13 |
| $c_{12}$ | 63 | 7 | 15 |

The propagation loss model was set to be 20 dB/dec loss. The interference observed by a connection had two components, that is, a co-channel interference component caused by other connections using the same frequency, and an ambient noise parameter. The ambient noise and fading effects were together modeled by a two-state Markov model, as described by S. Kallel, Analysis of memory and incremental redundancy ARQ schemes over a nonstationary channel, IEEE Trans. Communications, 40(9):1474–1480, September 1992, and incorporated by reference herein. A normal state with a low noise level of $10^{-10}$ mW and a high noise state of $10^{-8}$ mW were used.

The parameters monitored by the computer simulation include the percentage of mobile stations dropped, the distributions of mobile station lifetimes, the distributions of the fraction of a lifetime a connection experiencing an unsatisfactory quality, the distributions of the fraction of a lifetime a connection uses for performing a power-code update, and the distributions of the average power per information bit during the lifetime of a connection. For purposes of simulating the present invention, the percentage of mobile stations dropped excluded capacity drops resulting from the fixed channel allocation scheme.

Figure 3:
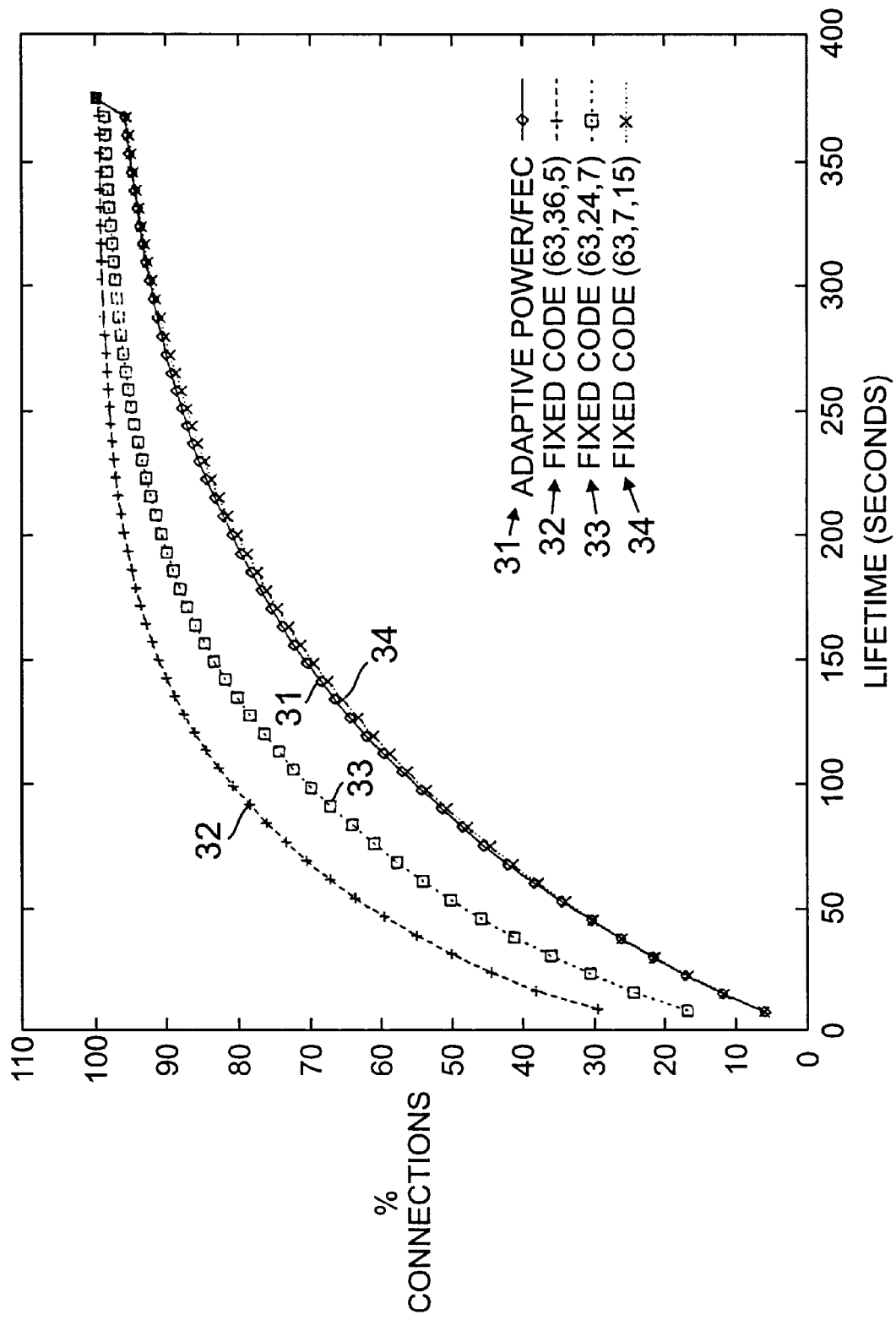
FIG. 3 is a graph showing cumulative distribution functions for lifetimes of mobile stations for the adaptive power/FEC method of the present invention and for a pure power control technique using several different fixed FEC codes.

FIG. 3 is a graph showing cumulative distribution functions (CDFs) for lifetimes of mobile stations for the adaptive power/FEC method of the present invention and for a pure power control technique using several different fixed FEC codes. All of these results of FIG. 3 are simulations of a fully loaded system. Curve 31 shows the cumulative distribution function for the adaptive power/FEC approach of the present invention. Curve 32 shows the cumulative distribution function for a power control approach using an FEC code of (63,36,5). Curves 33 and 34 respectively show the cumulative distribution function for power control approaches using FEC codes of (63,24,7) and (63,7,15). Basically, FIG. 3 shows that the lifetime of mobile stations using the adaptive approach of the present invention are almost identical to the lifetime the mobile stations would have experienced using the most heavily coded scheme. When a power control technique using progressively weaker codes is used, the mobile station lifetimes deteriorate, indicating that power control alone, without the ability to move to a stronger code, can cause connections to be dropped prematurely when compared to the present invention.

Figure 4:
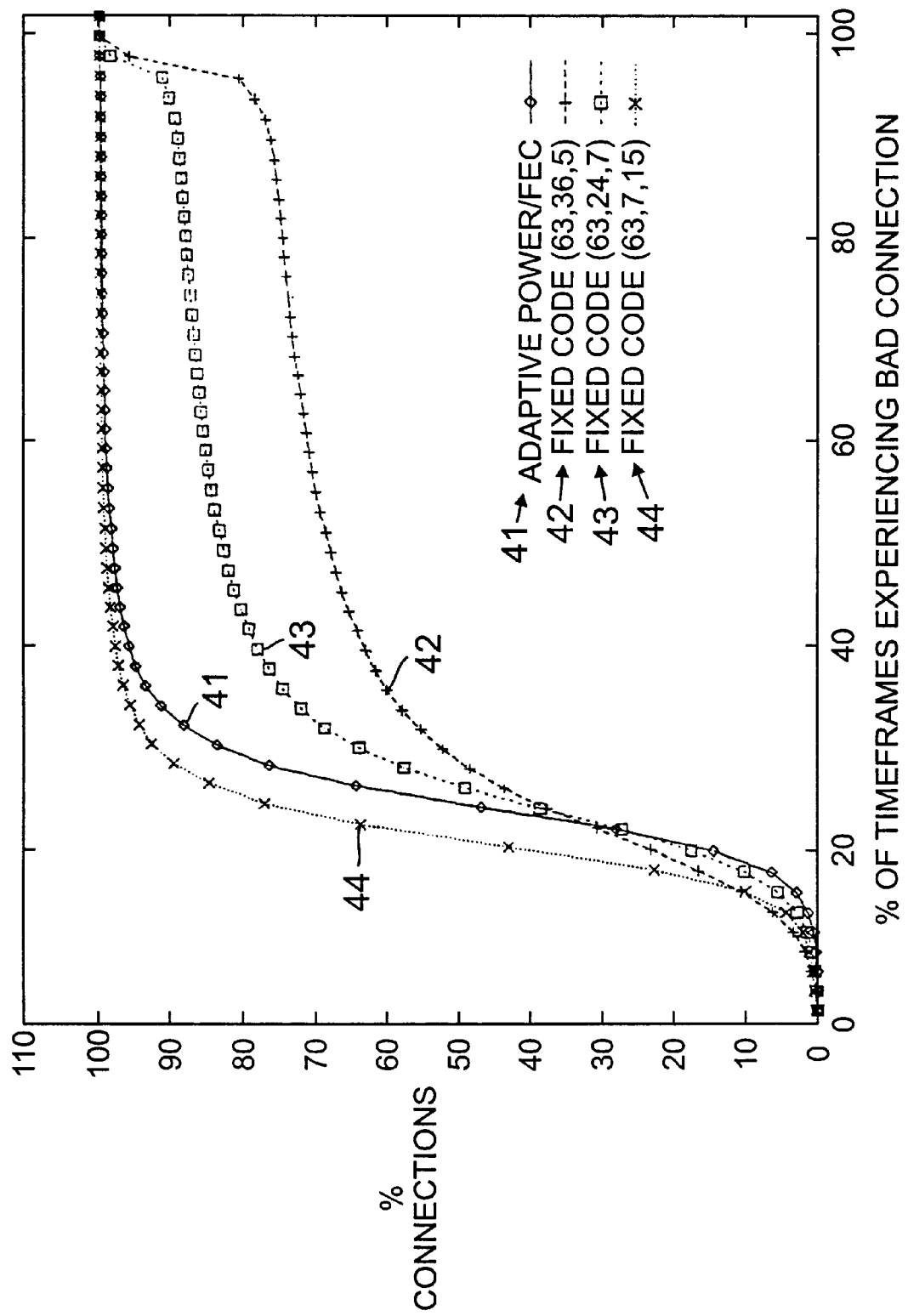
FIG. 4 is a graph showing cumulative distribution functions for the fraction of a lifetime of a connection that the connection experienced an unsatisfactory quality for the adaptive power/FEC method of the present invention and for a pure power control technique using several different fixed FEC codes.

FIG. 4 is a graph showing cumulative distribution functions for the fraction of a lifetime of a connection that the connection experienced an unsatisfactory quality for the adaptive power/FEC method of the present invention and for a pure power control technique using several different fixed FEC codes. Curve 41 shows the cumulative distribution for the adaptive power/FEC approach of the present invention. Curve 42 shows the cumulative distribution for a power control approach using an FEC code of (63,36,5). Curves 43 and 44 respectively show the cumulative distribution for power control approaches using FEC codes of (63,24,7) and (63,7,15). For the adaptive algorithm of the present invention, about 80% of the mobile stations spent less than 25% of their lifetimes in an unsatisfactory state. Only the strongest code, that is, an FEC code of (63,7,15), managed to perform better than the adaptive algorithm of the present invention.

Figure 5:
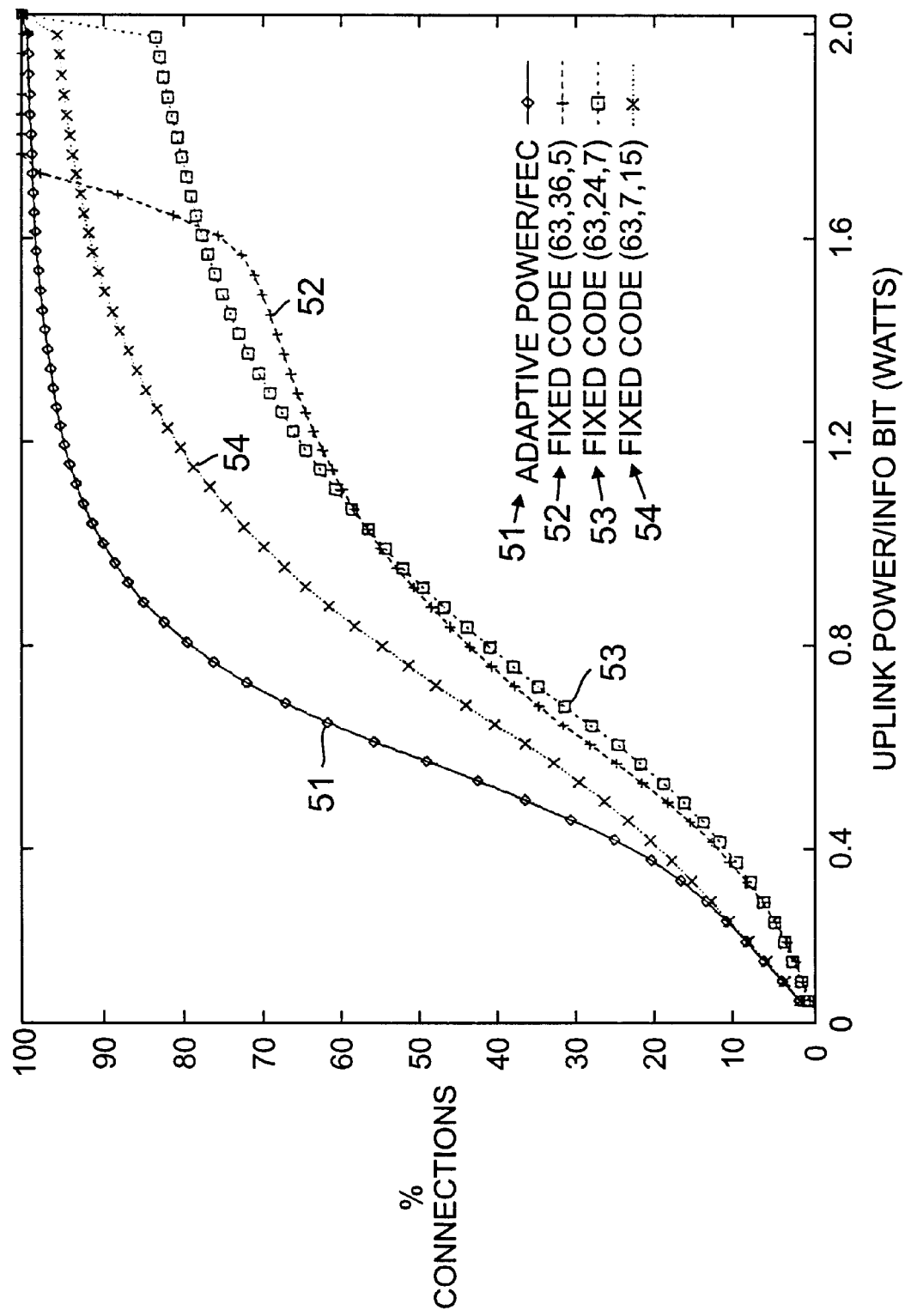
FIG. 5 is a graph showing cumulative distribution functions of the average uplink power per information bit used by mobile stations for the adaptive power/FEC method of the present invention and for a pure power control technique using several different fixed FEC codes.

FIG. 5 is a graph showing cumulative distribution functions of the average uplink power per information bit used by mobile stations for the adaptive power/FEC method of the present invention and for a pure power control technique using several different fixed FEC codes. The adaptive algorithm of the present invention is designed for optimizing this metric and outperforms the other fixed coding schemes. Curve 51 shows the cumulative distribution for the adaptive power/FEC approach of the present invention. Curve 52 shows the cumulative distribution for a power control approach using an FEC code of (63,36,5). Curves 53 and 54 respectively show the cumulative distribution for power control approaches using FEC codes of (63,24,7) and (63, 7,15).

Figure 6:
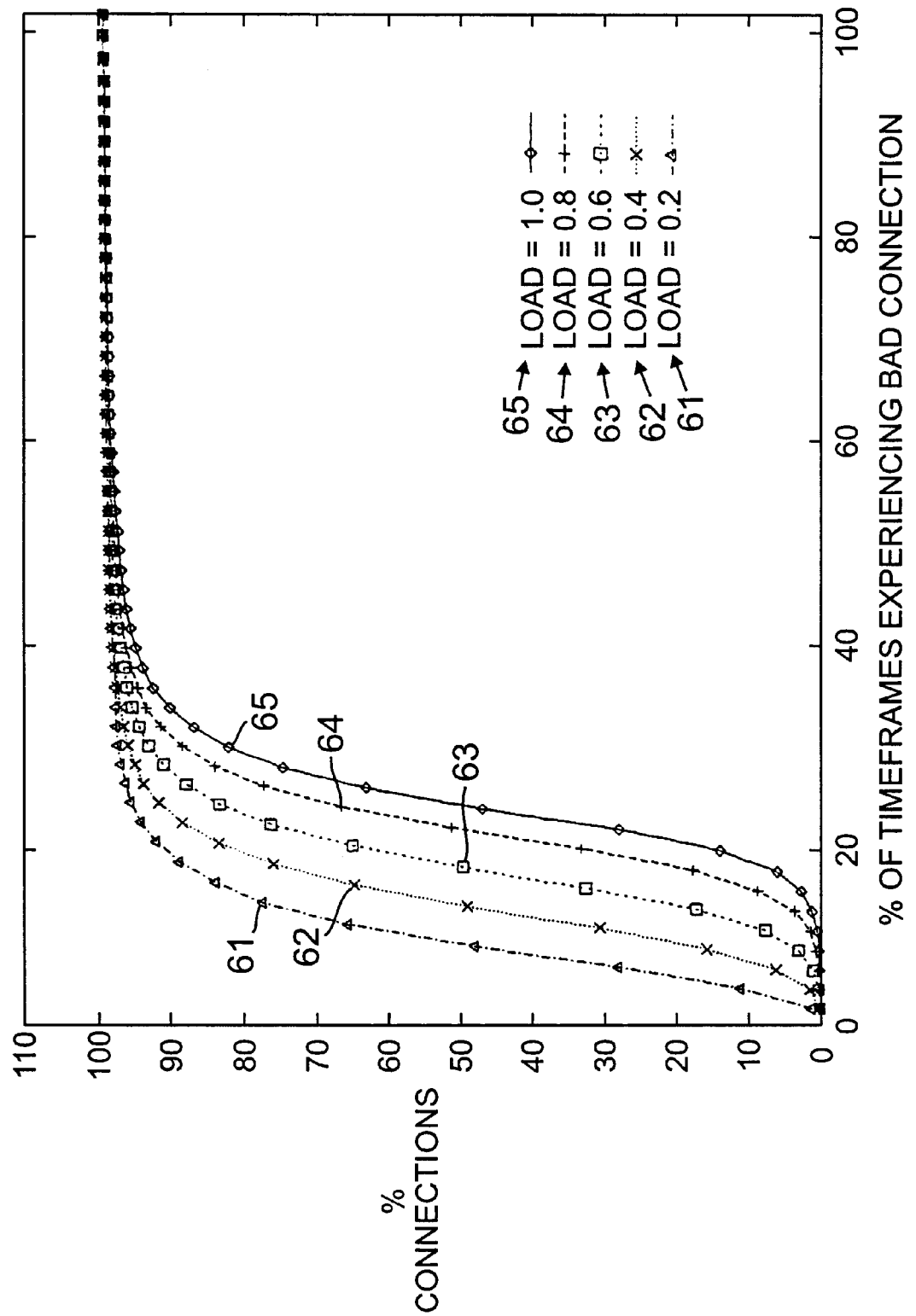
FIG. 6 is a graph showing cumulative distribution functions for the percentage of timeframes experiencing bad connections for the adaptive power/FEC method of the present invention for varying load factors.
Figure 7:
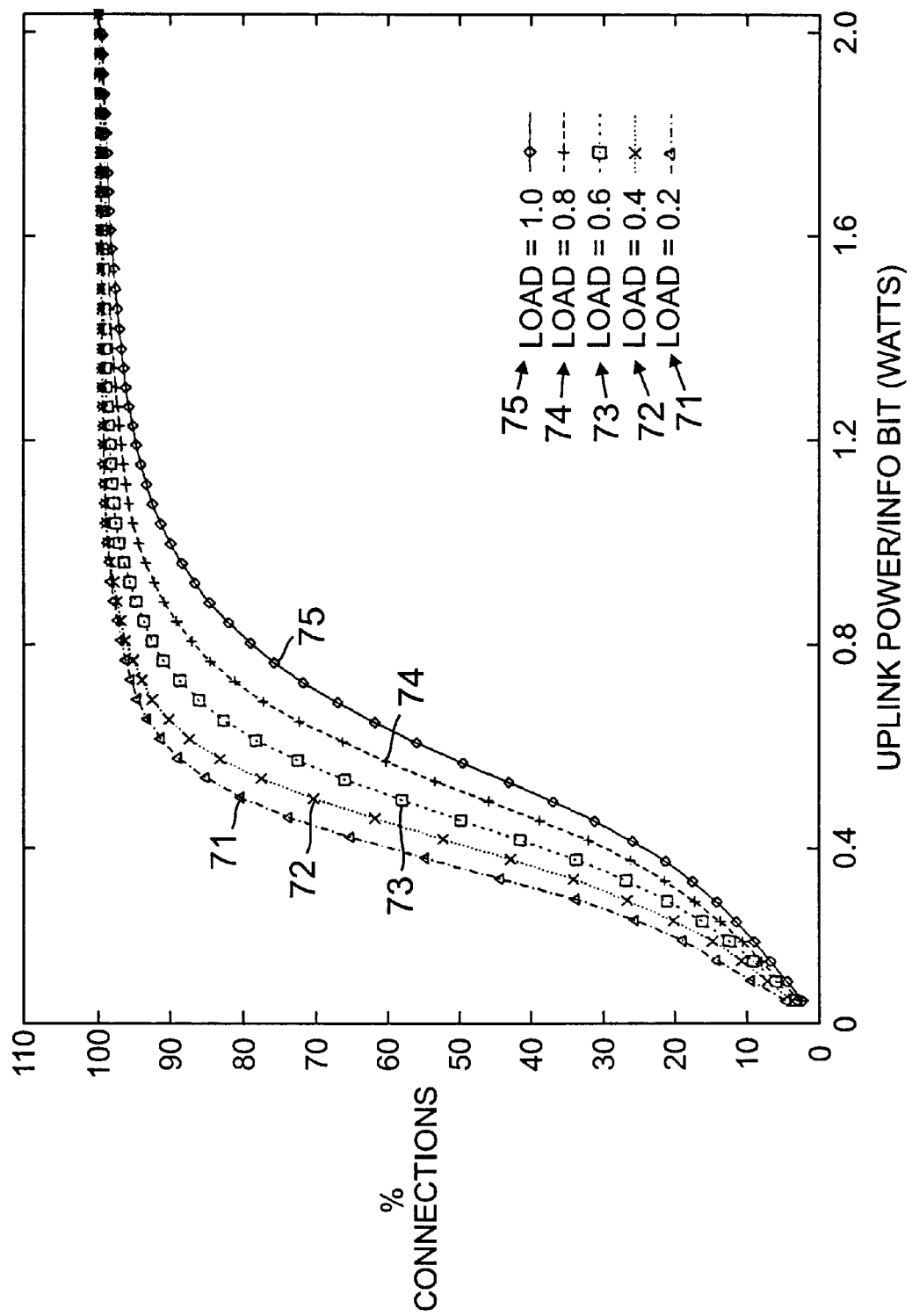
FIG. 7 is a graph showing cumulative distribution functions for uplink power per information bit for the adaptive power/FEC method of the present invention for varying load factors.

FIG. 6 is a graph showing cumulative distribution functions for the percentage of timeframes experiencing bad connections for the adaptive power/FEC method of the present invention for load factors varying from 0.2 to 1.0. Curve 61 shows the cumulative distribution for a load factor of 0.2. Curve 62 shows the cumulative distribution for a load factor of 0.4. Curve 63 shows the cumulative distribution for a load factor of 0.6. Curve 64 shows the cumulative distribution for a load factor of 0.8. Curve 65 shows the cumulative distribution for a load factor of 1.0. FIG. 7 is a graph showing cumulative distribution functions for uplink power per information bit for the adaptive power/FEC method of the present invention for load factors varying for 0.2 to 1.0. Curve 71 shows the cumulative distribution for a load factor of 0.2. Curve 72 shows the cumulative distribution for a load factor of 0.4. Curve 73 shows the cumulative distribution for a load factor of 0.6. Curve 74 shows the cumulative distribution for a load factor of 0.8. Curve 75 shows the cumulative distribution for a load factor of 1.0. The behavior of the present invention shown in FIGS. 6 and 7 is expected with increased interference effects arising from higher loads.

Figure 8:
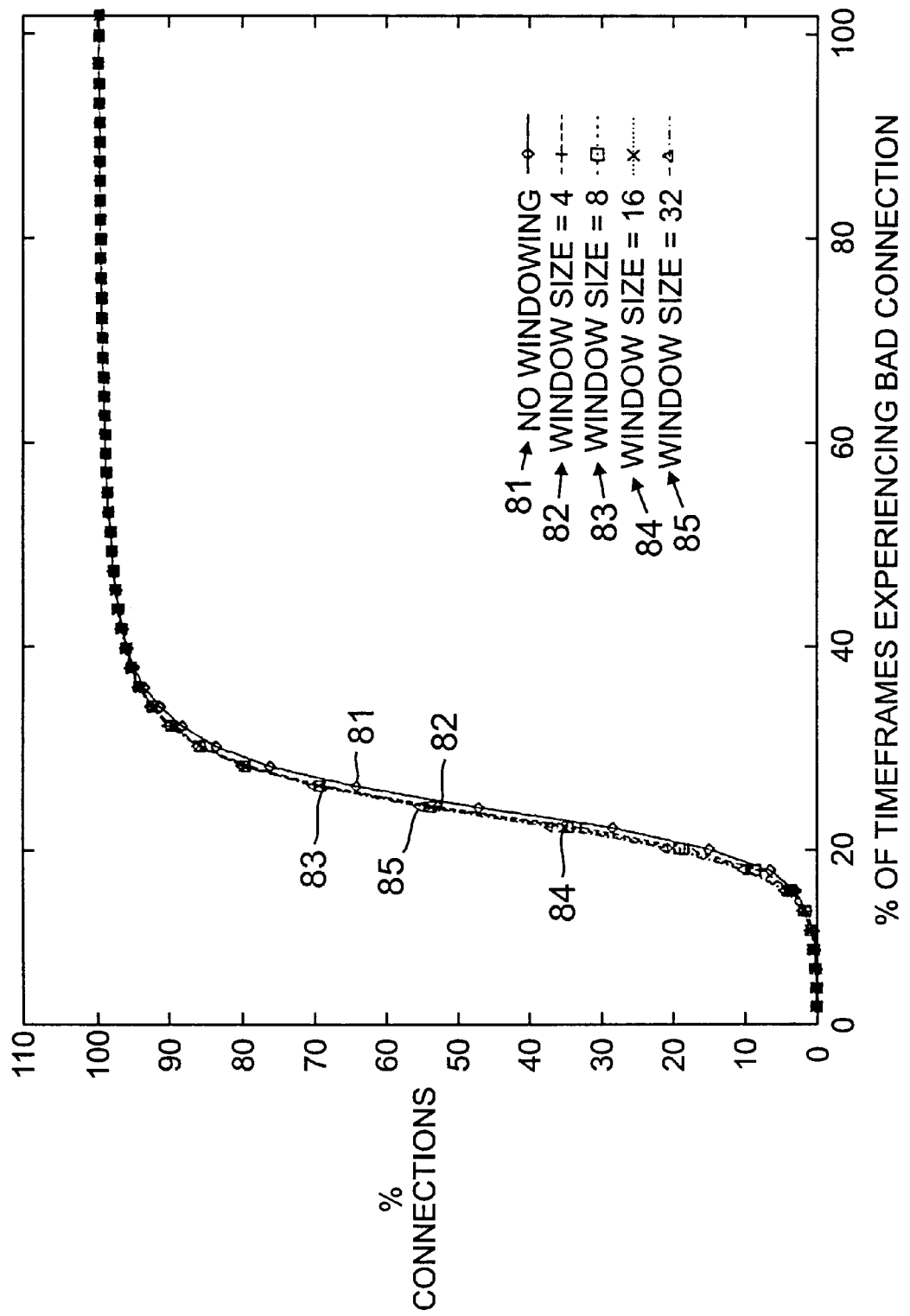
FIG. 8 is a graph showing cumulative distribution functions of bad connection times for different window sizes for the adaptive power/FEC method of the present invention.
Figure 9:
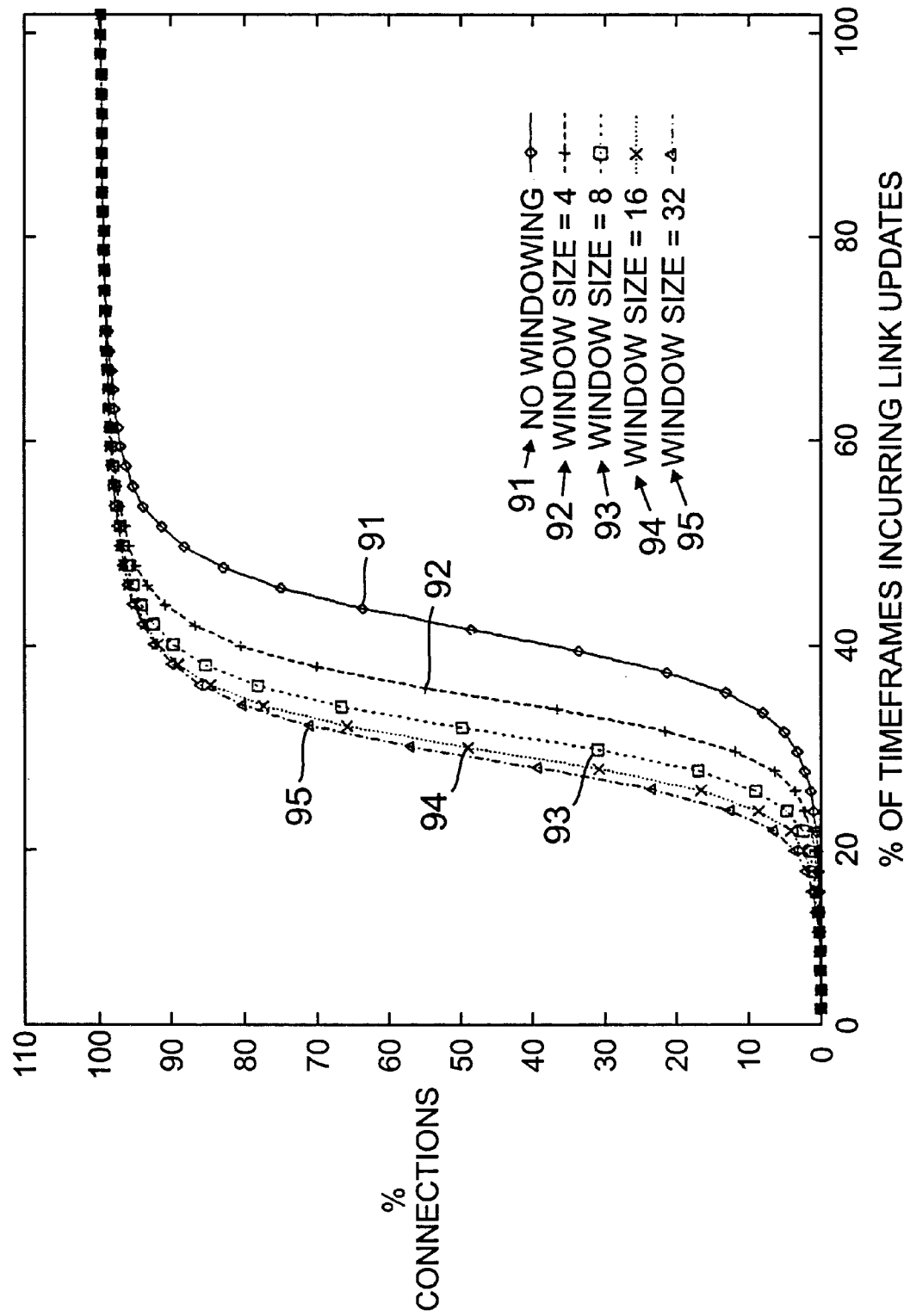
FIG. 9 is a graph showing cumulative distribution functions of the percentage of timeframes incurring link updates for different window sizes for the adaptive power/FEC method of the present invention.

FIG. 8 is a graph showing cumulative distribution functions of bad connection times for different window sizes for the adaptive power/FEC method of the present invention. Curve 81 is for no windowing. Curves 82–85 are for window sizes of 4, 8, 16 and 32 timeframes, respectively. FIG. 9 is a graph showing cumulative distribution functions of the percentage of timeframes incurring link updates for different window sizes for the adaptive power/FEC method of the present invention. Curve 91 is for no windowing. Curves 92–95 are for window sizes of 4, 8, 16 and 32 timeframes, respectively. FIGS. 8 and 9 basically show that using a window size of 32 timeframes decreases the link update overhead by about 20% with no corresponding increase in bad connection times.

Figure 10:
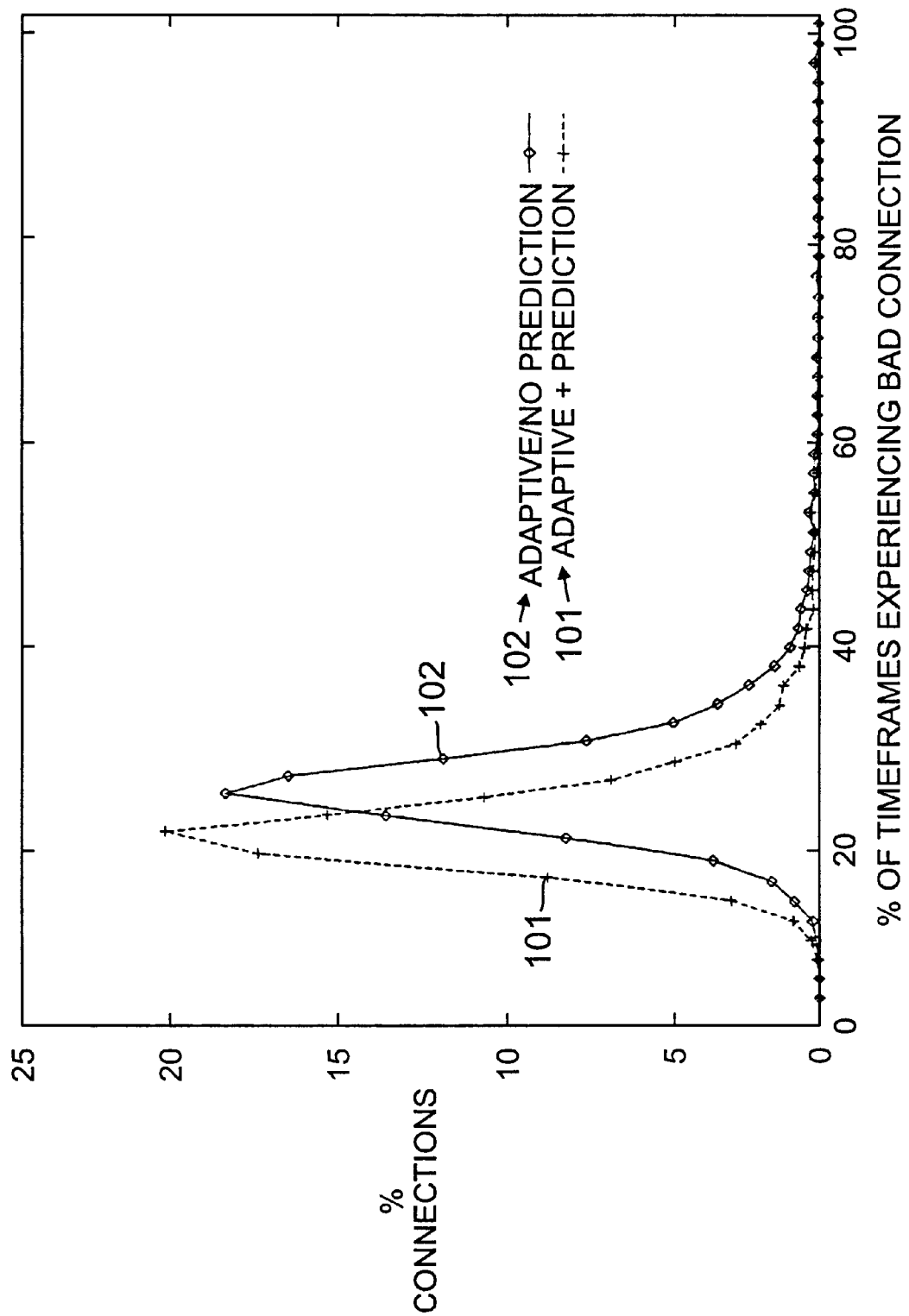
FIG. 10 is a graph showing probability distribution functions for bad connection times with and without prediction according to the present invention.
Figure 11:
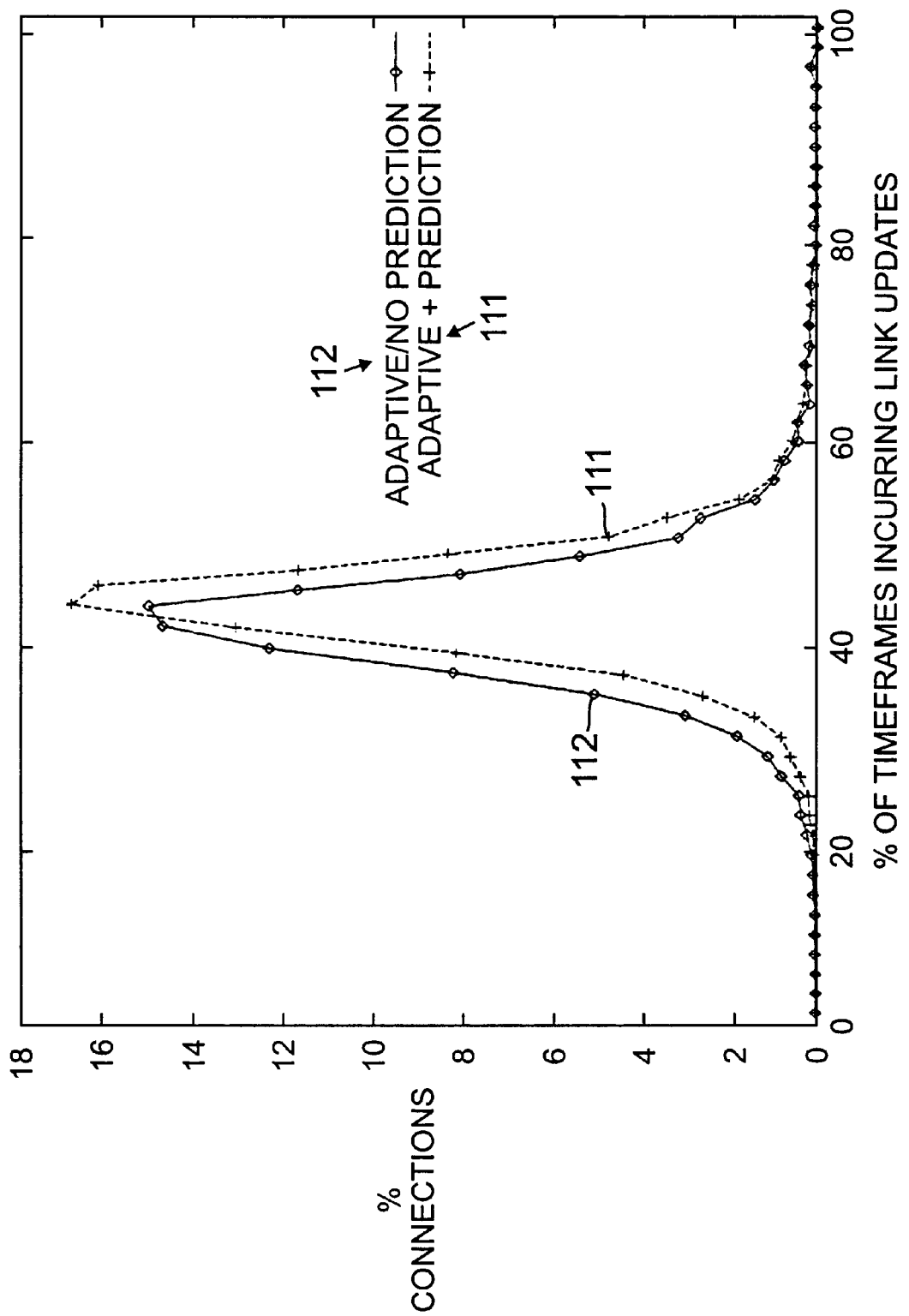
FIG. 11 is a graph showing the probability distribution functions for percentage of times incurring link updates with and without prediction according to the present invention.

The effects of the predictive feature of the present invention are shown in FIGS. 10 and 11. FIG. 10 is a graph showing probability distribution functions for bad connection times with and without the predictive feature of the present invention. Curve 101 shows the percentage of bad connection time with prediction, while curve 102 shows the percentage of bad connection time without prediction. FIG. 10 shows that prediction provides an approximately 5% decrease in the amount of time spent in an unacceptable state. FIG. 11 is a graph showing probability distribution functions for percentage of times incurring link updates with and without prediction. Curve 111 shows the percentage of bad connection time with prediction, while curve 112 shows the percentage of bad connection time without prediction. FIG. 11 shows that prediction provides an approximately 2% increase in the number of link updates.

While the present invention has been described in connection with the illustrated embodiments, it will be appreciated and understood that modifications may be made without departing from the true spirit and scope of the invention.

What is claimed is:

1. A method of determining an operating point of a transmitter of a transmitter-receiver pair in a wireless communication network, the method comprising the steps of:

averaging an observed word error rate $WER_{obs}$ for data transmitted during a plurality of timeframes over a link between a transmitter-receiver pair for a predetermined number of timeframes to generate an average observed word error rate avg__WER;

determining whether the averaged word error rate avg__WER is within an acceptable word error rate WER range; and determining a power-code pair (P,c) for a transmitter of the transmitter-receiver pair when the average observed word error rate avg__WER of the link between the transmitter-receiver pair is not within the acceptable word error rate WER range, the power code pair (P,c) defining the operating point of the transmitter, P of the power-code pair being a selected transmit power level of the transmitter and c of the power-code pair being a selected forward error correcting code used for encoding the data.

2. The method according to claim 1, further comprising the steps of:

encoding the data based on the selected forward error correcting code c; and transmitting the encoded data at the selected power level P.

3. The method according to claim 2, wherein the predetermined number of timeframes varies between an predetermined initial number of timeframes and a predetermined maximum number of timeframes.

4. The method according to claim 2, wherein the wireless communication system includes a plurality of transmitter-receiver pairs, and wherein the predetermined number of timeframes used for averaging the observed word error rate $WER_{obs}$ for each transmitter-receiver pair varies between a predetermined initial number of timeframes for each respective transmitter-receiver pair and a predetermined maximum number of timeframes for each respective transmitter-receiver pair.

5. The method according to claim 4, wherein the predetermined number of timeframes used for averaging the observed word error rate $WER_{obs}$ for each transmitter-receiver pair varies between the respective predetermined initial number of timeframes and the predetermined maximum number of timeframes independently from other transmitter-receiver pairs.

6. The method according to claim 2, wherein the step of determining whether the average observed word error rate avg_WER is within the acceptable word error rate WER range is performed at a receiver of the transmitter-receiver pair, and wherein the step of determining the power-code pair (P,c) is performed at the transmitter.

7. The method according to claim 6, wherein the step of determining the average observed word error rate avg_WER includes the step of measuring an observed word error rate $WER_{obs}$ over the predetermined number of timeframes.

8. The method according to claim 7, wherein the step of determining the average observed word error rate avg_WER further includes the steps of:

measuring an observed power $P_{obs}$ at the receiver; and measuring an observed interference $I_{obs}$ at the receiver.

9. The method according to claim 8, further comprising the steps of:

transmitting the average observed word error rate avg_WER, the observed power $P_{obs}$ and the observed interference $I_{obs}$ from the receiver to the transmitter, and determining the power-code pair (P,c) for the transmitter based on the average observed word error rate avg_WER, the observed power $P_{obs}$ and the observed interference $I_{obs}$.

10. The method according to claim 9, wherein the step of determining the power-code pair (P,c) includes the step of selecting the forward error correcting code c from a plurality of forward error correcting codes, the selected forward error correcting code providing a desired word error rate $WER_{des}$.

11. The method according to claim 10, wherein the step of determining the power-code pair (P,c) includes the step of selecting the transmit power level P to be between a minimum transmit power level and a maximum transmit power level of the transmitter.

12. The method according to claim 11, further comprising the steps of:

selecting the forward error correcting code from the plurality of forward error correcting codes that provides the maximum forward error correction capability when no power code pair (P,c) provides the desired word error rate $WER_{des}$;

selecting the maximum transmit power level of the transmitter when no power code pair (P,c) provides the desired word error rate $WER_{des}$;

encoding the data based on the selected forward error correcting code providing the maximum forward error correction capability; and transmitting the encoded data at the maximum transmit power level of the transmitter.

13. A method of determining an operating point of a transmitter of a transmitter-receiver pair in a wireless communication network, the method comprising the steps of:

determining a predicted word error rate $WER_{pred}$ for data transmitted during a plurality of timeframes over a link between a transmitter-receiver pair, the predicted word error rate $WER_{pred}$ being for a first timeframe of the plurality of timeframes based on an observed word error rate $WER_{obs}$ for a second timeframe of the plurality of timeframes, the second timeframe preceding the first timeframe in time;

determining whether the predicted word error rate $WER_{pred}$ is within an acceptable word error rate WER range; and determining a power-code pair (P,c) for a transmitter of the transmitter-receiver pair when the observed predicted word error $WER_{pred}$ of the link between the transmitter-receiver pair is not within the acceptable word error rate WER range, the power code pair (P,c) defining the operating point of the transmitter, P of the power-code pair being a selected transmit power level of the transmitter and c of the power-code pair being a selected forward error correcting code used for encoding the data.

14. The method according to claim 13, further comprising the steps of:

encoding the data based on the selected forward error correcting code c; and transmitting the encoded data at the selected power level P.

15. The method according to claim 14, wherein the step of determining whether the predicted word error rate $WER_{pred}$ is within the acceptable word error rate WER range is performed at a receiver of the transmitter-receiver pair, and wherein the step of determining the power-code pair (P,c) is performed at the transmitter.

16. The method according to claim 15, wherein the step of determining the predicted word error rate $WER_{pred}$ includes the step of measuring the observed word error rate $WER_{obs}$ of the second timeframe.

17. The method according to claim 16, wherein the step of determining the observed word error rate $WER_{obs}$ further includes the steps of:

measuring an observed power $P_{obs}$ at the receiver; and measuring an observed interference $I_{obs}$ at the receiver.

18. The method according to claim 17, further comprising the steps of:

transmitting the observed word error rate $WER_{obs}$, the observed power $P_{obs}$ and the observed interference $I_{obs}$ from the receiver to the transmitter, and determining the power-code pair (P,c) for the transmitter based on the observed word error rate $WER_{obs5}$, the observed power $P_{obs}$ and the observed interference $I_{obs}$.

19. The method according to claim 18, wherein the step of determining the power-code pair (P,c) includes the step of selecting the forward error correcting code c from a plurality of forward error correcting codes, the selected forward error correcting code providing a desired word error rate $WER_{des}$.

20. The method according to claim 19, wherein the step of determining the power-code pair (P,c) includes the step of selecting the transmit power level P to be between a minimum transmit power level and a maximum transmit power level of the transmitter.

21. The method according to claim 20, further comprising the steps of:

selecting the forward error correcting code from the plurality of forward error correcting codes that provides the maximum forward error correction capability when no power code pair (P,c) provides the desired word error rate $WER_{des}$;

selecting the maximum transmit power level of the transmitter when no power code pair (P,c) provides the desired word error rate $WER_{des}$;

encoding the data based on the selected forward error correcting code providing the maximum forward error correction capability; and transmitting the encoded data at the maximum transmit power level of the transmitter.

22. A transmitter-receiver pair in a wireless communication network, the transmitter-receiver pair comprising:

a receiver receiving data over an uplink, the receiver measuring an observed word error rate $WER_{obs}$ for a predetermined number of timeframes, and determining whether an averaged word error rate avg_WER of the word error rate $WER_{obs}$ for the predetermined number of timeframes is within the acceptable word error rate WER range, and transmitting the average observed word error rate avg_WER over a downlink when the average observed word error rate avg_WER is not within an acceptable word error rate WER, the uplink being associated with the downlink; and a transmitter transmitting the data over the uplink, the transmitter receiving the average observed word error rate avg_WER over the downlink and determining a power-code pair (P,c) for the transmitter based on the average observed word error rate avg_WER, the power code pair (P,c) defining an operating point of the transmitter, P of the power-code pair being a selected transmit power level of the transmitter and c of the power-code pair being a selected forward error correcting code used for encoding the data, and the transmitter encoding the data based on the selected forward error correcting code c and transmitting the encoded data at the selected power level P;

wherein the wireless communication network includes a plurality of transmitter-receiver pairs, each transmitter-receiver pair having an uplink and a downlink; and wherein the predetermined number of timeframes used for averaging the observed word error rate $WER_{obs}$ for each transmitter-receiver pair varies between a predetermined initial number of timeframes corresponding to each transmitter-receiver pair and a predetermined maximum number of timeframes corresponding to each transmitter-receiver pair.

23. The transmitter-receiver pair according to claim 22, wherein the predetermined number of timeframes used for averaging the observed word error rate $WER_{obs}$ for each transmitter-receiver pair varies independently from other transmitter-receiver pairs.

24. A transmitter-receiver pair in a wireless communication network, the transmitter-receiver pair comprising:

a receiver receiving data over an uplink, the receiver measuring an observed word error rate $WER_{obs}$ for a predetermined number of timeframes, and determining whether an averaged word error rate avg_WER of the word error rate $WER_{obs}$ for the predetermined number of timeframes is within the acceptable word error rate WER range, and transmitting the average observed word error rate avg_WER over a downlink when the average observed word error rate avg_WER is not within an acceptable word error rate WER, the uplink being associated with the downlink; and a transmitter transmitting the data over the uplink, the transmitter receiving the average observed word error rate avg_WER over the downlink and determining a power-code pair (P,c) for the transmitter based on the average observed word error rate avg_WER, the power code pair (P,c) defining an operating point of the transmitter, P of the power-code pair being a selected transmit power level of the transmitter and c of the power-code pair being a selected forward error correcting code used for encoding the data, and the transmitter encoding the data based on the selected forward error correcting code c and transmitting the encoded data at the selected power level P;

wherein the receiver further measures an observed power $P_{obs}$ and an observed interference lobs of the received data, and transmits the observed power $P_{obs}$ and the observed interference $I_{obs}$ over the downlink with the observed word error rate $WER_{obs}$, and wherein the transmitter determines the power-code pair (P,c) further based on the observed power $P_{obs}$ and the observed interference $I_{obs}$.

25. The transmitter-receiver pair according to claim 24, wherein the transmitter includes a memory storing a plurality of forward error correcting codes, the transmitter selecting the forward error correcting code c from the plurality of forward error correcting codes, the selected forward error correcting code c providing a desired word error rate $WER_{des}$.

26. The transmitter-receiver pair according to claim 25, wherein the transmitter has a minimum transmit power level and a maximum transmit power level, and wherein the transmitter selects the transmit power level P to be between the minimum transmit power level and the maximum transmit power level.

27. The transmitter-receiver pair according to claim 26, wherein the transmitter selects the forward error correcting code from the plurality of forward error correcting codes, the selected forward error correcting code providing the maximum forward error correction capability when no power code pair (P,c) provides the desired word error rate $WER_{des}$, and wherein the transmitter selects the maximum transmit power level of the transmitter when no power code pair (P,c) provides the desired word error rate $WER_{des}$.

28. A transmitter-receiver pair in a wireless communication network, the transmitter-receiver pair comprising:

a receiver receiving data over an uplink, the receiver measuring an observed word error rate $WER_{obs}$ of the received data, determining a predicted word error rate $WER_{pred}$ for a first timeframe based on the observed word error rate $WER_{obs}$ for a second timeframe, and determining whether the predicted word error rate $WER_{pred}$ is within the acceptable word error rate WER range, the second timeframe preceding the first timeframe in time, and transmitting the predicted word error rate $WER_{pred}$ over a downlink when the predicted word error rate $WER_{pred}$ is not within the acceptable word error rate WER, the uplink being associated with the downlink; and a transmitter transmitting the data over the uplink, the transmitter receiving the observed word error rate $WER_{obs}$ over the downlink and determining a power-code pair (P,c) for the transmitter based on the observed word error rate $WER_{obs}$, the power code pair (P,c) defining an operating point of the transmitter, P of the power-code pair being a selected transmit power level of the transmitter and c of the power-code pair being a selected forward error correcting code used for encoding the data, and the transmitter encoding the data based on the selected forward error correcting code c, and transmitting the encoded data at the selected power level P.

29. The transmitter-receiver pair according to claim 28, wherein the wireless communication network includes a plurality of transmitter-receiver pairs, each transmitter-receiver pair having an uplink and a downlink.

30. The transmitter-receiver pair according to claim 28, wherein the receiver further measures an observed power $P_{obs}$ and an observed interference $I_{obs}$ of the received data, and transmits the observed power $P_{obs}$ and the observed interference $I_{obs}$ over the downlink with the observed word error rate $WER_{obs}$, and wherein the transmitter determines the power-code pair (P,c) further based on the observed power $P_{obs}$ and the observed interference $I_{obs}$.

31. The transmitter-receiver pair according to claim 30, wherein the transmitter includes a memory storing a plurality of forward error correcting codes, the transmitter selecting the forward error correcting code c from the plurality of forward error correcting codes, the selected forward error correcting code c providing a desired word error rate $WER_{des}$.

32. The transmitter-receiver pair according to claim 31, wherein the transmitter has a minimum transmit power level and a maximum transmit power level, and wherein the transmitter selects the transmit power level P to be between the minimum transmit power level and the maximum transmit power level.

33. The transmitter-receiver pair according to claim 31, wherein the transmitter selects the forward error correcting code from the plurality of forward error correcting codes, the selected forward error correcting code providing the maximum forward error correction capability when no power code pair (P,c) provides the desired word error rate $WER_{des}$, and wherein the transmitter selects the maximum transmit power level of the transmitter when no power code pair (P,c) provides the desired word error rate $WER_{des}$.

\* \* \* \* \*